US012629735B2

(12) United States Patent
Koenig et al.

(10) Patent No.: US 12,629,735 B2
(45) Date of Patent: May 19, 2026

(54) SYSTEM AND METHOD FOR SEPARATION OF ORGANICS AND LIQUIDS FROM WASTE MATERIAL

(71) Applicants: Mark E. Koenig, Carroll, OH (US); Larry E. Koenig, Canal Winchester, OH (US)

(72) Inventors: Mark E. Koenig, Carroll, OH (US); Larry E. Koenig, Canal Winchester, OH (US)

(73) Assignee: Komar Industries. LLC, Groveport, OH (US)

( * ) Notice: Subject to any disclaimer, the term of this patent is extended or adjusted under 35 U.S.C. 154(b) by 138 days.

(21) Appl. No.: 16/911,034

(22) Filed: Jun. 24, 2020

(65) Prior Publication Data

US 2020/0398321 A1 Dec. 24, 2020

Related U.S. Application Data

(60) Provisional application No. 62/865,713, filed on Jun. 24, 2019.

(51) Int. Cl.
  B09B 3/32 (2022.01)
  B01D 29/60 (2006.01)
  (Continued)

(52) U.S. Cl.
  CPC ................ B09B 3/32 (2022.01); B01D 29/60 (2013.01); B01D 29/885 (2013.01); B01D 37/04 (2013.01);
  (Continued)

(58) Field of Classification Search
  CPC .................................. B02C 19/22; D21D 1/30
  (Continued)

(56) References Cited

U.S. PATENT DOCUMENTS 728,516 A 5/1903 Trabue
829,315 A 8/1906 Anderson
(Continued)

FOREIGN PATENT DOCUMENTS

CA 2403685 C 12/2008
CA 2728377 A1 6/2012
(Continued)

OTHER PUBLICATIONS

Sebright Products, Inc., Bright Technologies—Innovators in Dewatering Equipment Technologies, product information, 2 pages, found at www.brightbeltpress.com, copyrighted 2006.
(Continued)

*Primary Examiner* — Bobby Yeonjin Kim
(74) *Attorney, Agent, or Firm* — Standley Law Group LLP; Jeffrey C. Norris; Bryan P. Finneran

(57) ABSTRACT

A waste processing system and method for improving compaction and/or separating organics and liquids from waste material. An elongated extrusion screw and/or an adjustable compression gate may be provided to improve the compression of waste material. An improved extraction tube may also be provided to facilitate separation and removal of organics and other liquids from the compressed material. At least one sensor may be provided for sensing an increasing accumulation of waste material awaiting to be processed. An exemplary embodiment may also be adapted to add dry fraction to a waste load that is wet with organics or other liquids to improve compressibility. A system and method may also be adapted to automatically adjust to improve compression of the material and facilitate more efficient production.

6 Claims, 3 Drawing Sheets

(51) Int. Cl.

| | |
|---|---|
| *B01D 29/88* | (2006.01) |
| *B01D 37/04* | (2006.01) |
| *B07B 1/00* | (2006.01) |
| *B30B 9/12* | (2006.01) |
| *B30B 9/14* | (2006.01) |
| *B30B 9/18* | (2006.01) |
| *B30B 9/26* | (2006.01) |

(52) U.S. Cl.

CPC ......... *B01D 37/045* (2013.01); *B01D 37/046* (2013.01); *B07B 1/00* (2013.01); *B30B 9/125* (2013.01); *B30B 9/14* (2013.01); *B30B 9/18* (2013.01); *B30B 9/26* (2013.01)

(58) Field of Classification Search

USPC .......................................... 241/248; 210/768

See application file for complete search history.

(56) References Cited

U.S. PATENT DOCUMENTS

| | | | |
|---|---|---|---|
| 1,221,054 A | | 4/1917 | Hyatt |
| 1,354,528 A | | 10/1920 | Wertenbruch |
| 1,506,036 A | | 8/1924 | Willmarth |
| 2,171,065 A | | 8/1939 | Johnson |
| 2,340,009 A | | 1/1944 | Meakin |
| 2,411,917 A | | 12/1946 | Wooster |
| 2,470,278 A | | 5/1949 | West |
| 2,576,784 A | | 11/1951 | Galen |
| 2,615,387 A | | 10/1952 | Messing |
| 2,708,074 A | | 5/1955 | Hoskins |
| 2,709,956 A | | 6/1955 | Napier |
| 2,731,208 A | | 1/1956 | Dodd |
| 2,823,603 A | | 2/1958 | Collins |
| 2,823,799 A | | 2/1958 | Gangell |
| 2,831,587 A | | 4/1958 | Rearick |
| 2,902,922 A | | 9/1959 | Williams |
| 2,982,201 A | | 5/1961 | Raymond |
| 3,021,162 A | | 2/1962 | Jahn |
| 3,135,193 A | | 6/1964 | Hunt et al. |
| 3,179,040 A | | 4/1965 | Seltzer |
| 3,310,836 A | | 3/1967 | Nichols |
| 3,376,910 A | | 4/1968 | Popeil |
| 3,398,677 A | | 8/1968 | Theobald et al. |
| 3,547,577 A | | 12/1970 | Lovercheck |
| 3,552,423 A | | 1/1971 | Vietorisz |
| 3,588,356 A | | 6/1971 | Poux et al. |
| 3,654,854 A | | 4/1972 | Cook et al. |
| 3,691,019 A | | 9/1972 | Brimhall |
| 3,709,411 A | | 1/1973 | Shapland |
| 3,756,434 A | | 9/1973 | Teske |
| 3,763,773 A | | 10/1973 | Clay |
| 3,771,531 A | | 11/1973 | Scribner |
| 3,787,830 A | | 1/1974 | Cato |
| 3,799,405 A | | 3/1974 | Wallace |
| 3,841,465 A | | 10/1974 | Miler |
| 3,843,064 A | | 10/1974 | Suzuki |
| 3,866,529 A | | 2/1975 | Holman |
| 3,877,365 A | | 4/1975 | Berggren |
| 3,883,080 A | | 5/1975 | Andersson |
| 3,897,882 A | | 8/1975 | Budoff |
| 3,921,545 A | | 11/1975 | Ruegsegger |
| 3,938,434 A | | 2/1976 | Cox |
| 3,982,483 A | | 9/1976 | Bird et al. |
| 3,993,254 A | | 11/1976 | Bicik et al. |
| 4,037,528 A | | 7/1977 | White |
| 4,040,571 A | | 8/1977 | Lindeborg |
| 4,042,207 A | | 8/1977 | Nehrlich et al. |
| 4,043,471 A | | 8/1977 | Trumball et al. |
| 4,044,904 A | | 8/1977 | Trumbull |
| 4,070,161 A | | 1/1978 | Harter |
| 4,109,966 A | | 8/1978 | Boyhont |
| 4,113,185 A | | 9/1978 | Marsh et al. |
| 4,117,776 A | | 10/1978 | Hunt |
| 4,214,239 A | | 7/1980 | Dillard |
| 4,214,859 A | | 7/1980 | Anders |
| 4,227,630 A | | 10/1980 | Fehling |
| 4,253,390 A | | 3/1981 | Hunt et al. |
| 4,253,615 A | | 3/1981 | Koenig |
| 4,255,161 A | | 3/1981 | Grimminger |
| 4,256,035 A | | 3/1981 | Neufeldt |
| 4,274,790 A | | 6/1981 | Baker |
| 4,280,415 A | | 7/1981 | Wirguin |
| 4,283,252 A | | 8/1981 | Reinhall |
| 4,289,067 A | | 9/1981 | Hanak |
| 4,296,776 A | | 10/1981 | Muller et al. |
| 4,323,007 A | | 4/1982 | Hunt et al. |
| 4,325,787 A | | 4/1982 | Strumskis |
| 4,337,789 A | | 7/1982 | Lonardo |
| 4,355,905 A | | 10/1982 | St. Louis et al. |
| 4,358,995 A | | 11/1982 | Ballo et al. |
| 4,378,298 A | | 3/1983 | Payne |
| 4,426,922 A | | 1/1984 | Yamamoto |
| 4,448,588 A | | 5/1984 | Cheng |
| 4,449,671 A | | 5/1984 | Martinez-Vera et al. |
| 4,457,804 A | * | 7/1984 | Reinhall ................. D21B 1/12 241/245 |
| 4,483,370 A | | 11/1984 | Talasz |
| 4,516,489 A | | 5/1985 | Ballo |
| 4,516,492 A | | 5/1985 | Olfert |
| 4,545,801 A | | 10/1985 | Neale |
| 4,567,820 A | | 2/1986 | Munsell |
| 4,570,550 A | | 2/1986 | Wilt |
| 4,578,185 A | | 3/1986 | Wilson et al. |
| 4,581,992 A | | 4/1986 | Koch |
| 4,585,543 A | | 4/1986 | Duncan et al. |
| 4,597,487 A | | 7/1986 | Crosby |
| 4,632,317 A | | 12/1986 | Wexell |
| 4,636,127 A | | 1/1987 | Olano et al. |
| 4,670,227 A | | 6/1987 | Smith |
| 4,688,597 A | | 8/1987 | Clarkson et al. |
| 4,709,628 A | | 12/1987 | Glowacki |
| 4,747,343 A | | 5/1988 | St. Clair |
| 4,762,280 A | | 8/1988 | Prisco et al. |
| 4,770,236 A | | 9/1988 | Kulikowski |
| 4,784,563 A | | 11/1988 | Esh et al. |
| 4,807,816 A | | 2/1989 | Ataka |
| 4,817,518 A | | 4/1989 | Wyatt et al. |
| 4,838,750 A | | 6/1989 | Finch |
| 4,848,249 A | | 7/1989 | LePori et al. |
| 4,852,817 A | | 8/1989 | Tipton |
| 4,881,862 A | | 11/1989 | Dick |
| 4,884,756 A | | 12/1989 | Pearson |
| 4,897,194 A | | 1/1990 | Olson |
| 4,915,308 A | | 4/1990 | Koenig |
| 4,938,426 A | | 7/1990 | Koenig |
| 4,951,884 A | | 8/1990 | Koenig |
| 4,961,539 A | | 10/1990 | Deem |
| 4,968,325 A | | 11/1990 | Black et al. |
| 4,974,781 A | | 12/1990 | Placzek |
| 4,978,369 A | | 12/1990 | Pontow et al. |
| 4,993,649 A | | 2/1991 | Koenig |
| 5,022,328 A | | 6/1991 | Robertson |
| 5,040,736 A | | 8/1991 | Obitz |
| 5,048,766 A | | 9/1991 | Gaylor et al. |
| 5,054,696 A | | 10/1991 | Mennel et al. |
| 5,087,420 A | | 2/1992 | Jackson |
| 5,089,228 A | | 2/1992 | Meijer |
| 5,095,825 A | | 3/1992 | Arpalahti |
| 5,098,267 A | | 3/1992 | Cheng |
| 5,099,986 A | | 3/1992 | Kuzub |
| 5,108,040 A | | 4/1992 | Koenig |
| 5,114,331 A | | 5/1992 | Umehara et al. |
| 5,116,574 A | | 5/1992 | Person |
| 5,119,994 A | | 6/1992 | Placzek |
| 5,148,994 A | | 9/1992 | Taider et al. |
| 5,148,998 A | | 9/1992 | Obitz |
| 5,159,429 A | | 10/1992 | Firpo |
| 5,167,372 A | | 12/1992 | Poggie et al. |
| 5,180,225 A | | 1/1993 | Piccolo, Sr. et al. |
| 5,190,226 A | | 3/1993 | Holloway |
| 5,205,379 A | | 4/1993 | Pfleger |
| 5,206,495 A | | 4/1993 | Garnier |
| 5,217,173 A | | 6/1993 | Koenig |

(56) References Cited

U.S. PATENT DOCUMENTS

| | | | |
|---|---|---|---|
| 5,232,170 | A | 8/1993 | Yang |
| 5,246,180 | A | 9/1993 | Berry, III |
| 5,271,426 | A | 12/1993 | Clarkson et al. |
| 5,277,136 | A | 1/1994 | Davis |
| 5,308,003 | A | 5/1994 | Koenig |
| 5,328,015 | A | 7/1994 | Volk, Jr |
| 5,333,738 | A | 8/1994 | Fuchs et al. |
| 5,346,142 | A | 9/1994 | Miller et al. |
| 5,351,899 | A | 10/1994 | Koenig |
| 5,360,594 | A | 11/1994 | Meijer |
| 5,362,443 | A | 11/1994 | Tanaka et al. |
| 5,364,589 | A | 11/1994 | Buehler et al. |
| 5,366,680 | A | 11/1994 | Foresman |
| 5,373,923 | A | 12/1994 | Koenig |
| 5,383,397 | A | 1/1995 | Battles |
| 5,384,092 | A | 1/1995 | Sawhill et al. |
| 5,389,347 | A | 2/1995 | Hall |
| 5,427,737 | A | 6/1995 | Glazer et al. |
| 5,452,692 | A | 9/1995 | Spray |
| 5,462,238 | A | 10/1995 | Smith |
| 5,466,108 | A | 11/1995 | Piroska |
| 5,470,022 | A | 11/1995 | Wright et al. |
| 5,479,728 | A | 1/1996 | Deken |
| 5,481,851 | A | 1/1996 | Koenig |
| 5,529,644 | A | 6/1996 | Parayil |
| 5,566,890 | A | 10/1996 | Ricciardelli |
| 5,570,845 | A | 11/1996 | Lewis et al. |
| 5,580,241 | A | 12/1996 | Koeberle |
| 5,601,239 | A | 2/1997 | Smith |
| 5,611,268 | A | 3/1997 | Hamilton |
| 5,635,122 | A | 6/1997 | Vezzani |
| 5,649,785 | A | 7/1997 | Djerf et al. |
| 5,662,035 | A | 9/1997 | Lee |
| 5,681,132 | A | 10/1997 | Sheppard |
| 5,692,382 | A | 12/1997 | Davison |
| 5,695,136 | A | 12/1997 | Rohden et al. |
| 5,735,199 | A | 4/1998 | Esau |
| 5,819,643 | A | 10/1998 | Mcilwain |
| RE36,023 | E | 1/1999 | Koenig |
| 5,857,406 | A | 1/1999 | Scheucher et al. |
| 5,871,619 | A | 2/1999 | Finley |
| 5,873,304 | A | 2/1999 | Ruf |
| 5,919,497 | A | 7/1999 | Kofahl |
| 5,941,468 | A | 8/1999 | Lewis et al. |
| 5,996,770 | A | 12/1999 | Kjelkqvist |
| 5,998,640 | A | 12/1999 | Haefele et al. |
| 6,024,226 | A | 2/2000 | Olivier |
| 6,050,204 | A | 4/2000 | Stevers et al. |
| 6,092,752 | A | 7/2000 | Koenig |
| 6,120,648 | A | 9/2000 | Scott |
| 6,126,907 | A | 10/2000 | Wada |
| 6,149,773 | A | 11/2000 | Grimshaw et al. |
| 6,186,060 | B1 | 2/2001 | Peterson |
| 6,226,889 | B1 | 5/2001 | Aulbaugh et al. |
| 6,247,662 | B1 | 6/2001 | Hamilton |
| 6,269,286 | B1 | 7/2001 | Tse et al. |
| 6,271,492 | B1 | 8/2001 | Maehata et al. |
| 6,276,622 | B1 | 8/2001 | Obitz |
| 6,365,857 | B1 | 4/2002 | Maehata et al. |
| 6,389,821 | B2 | 5/2002 | Moraski |
| 6,505,550 | B2 | 1/2003 | Hamilton |
| 6,588,690 | B1 | 7/2003 | Koenig |
| 6,615,710 | B1 | 9/2003 | Ishigaki et al. |
| 6,752,337 | B2 | 6/2004 | Koenig |
| 6,761,864 | B2 | 7/2004 | Jasra |
| 6,793,165 | B2 | 9/2004 | Obitz |
| 6,830,597 | B1 | 12/2004 | Green |
| 6,945,487 | B2 | 9/2005 | Obitz |
| 6,948,329 | B2 | 9/2005 | Nomura et al. |
| 6,972,114 | B2 | 12/2005 | Pope et al. |
| 6,994,016 | B1 | 2/2006 | Bunker et al. |
| 7,011,018 | B2 | 3/2006 | Schroeder et al. |
| 7,028,610 | B1 | 4/2006 | Ralicki |
| 7,226,092 | B2 | 6/2007 | Anzai |
| 7,226,213 | B2 | 6/2007 | Roos |
| 7,229,526 | B2 | 6/2007 | Obitz |
| 7,234,915 | B2 | 6/2007 | Obitz |
| 7,360,639 | B2 | 4/2008 | Sprouse et al. |
| 7,523,996 | B1 | 4/2009 | Darst |
| 7,631,596 | B2 | 12/2009 | Williams |
| 7,740,325 | B1 | 6/2010 | Chen |
| 7,828,482 | B2 | 11/2010 | Beausoleil et al. |
| 7,851,585 | B2 | 12/2010 | Brison et al. |
| 7,926,750 | B2 | 4/2011 | Koch et al. |
| 7,958,820 | B2 | 6/2011 | Duperon |
| 7,964,004 | B2 | 6/2011 | Koch et al. |
| 8,033,733 | B2 | 10/2011 | Lang |
| 8,100,066 | B2 | 1/2012 | Stein |
| 8,151,716 | B2 | 4/2012 | Harned et al. |
| 8,317,886 | B2 | 11/2012 | Graham et al. |
| 8,381,900 | B1 | 2/2013 | Hoogestraat |
| 8,708,266 | B2 | 4/2014 | Koenig et al. |
| 8,720,330 | B1 | 5/2014 | Koenig |
| 8,720,805 | B1 | 5/2014 | Koenig |
| 8,726,804 | B1 | 5/2014 | Koenig |
| 8,834,013 | B2 | 9/2014 | Bollschweiler |
| 8,851,409 | B2 | 10/2014 | Koenig et al. |
| 9,032,871 | B1 | 5/2015 | Koenig |
| 9,089,143 | B2 | 7/2015 | Estes |
| 9,132,967 | B2 | 9/2015 | Koenig |
| 9,132,968 | B2 | 9/2015 | Koenig |
| 9,152,087 | B2 | 10/2015 | Yoshii et al. |
| 9,212,005 | B1 | 12/2015 | Koenig |
| 9,278,814 | B2 | 3/2016 | Koenig |
| 9,346,624 | B2 | 5/2016 | Koenig |
| 9,403,336 | B2 | 8/2016 | Koenig et al. |
| 9,550,630 | B2 | 1/2017 | Koenig |
| 9,586,770 | B2 | 3/2017 | Koenig |
| 9,592,963 | B2 | 3/2017 | Koenig |
| 9,815,636 | B2 | 11/2017 | Koenig |
| 9,821,962 | B2 | 11/2017 | Koenig et al. |
| 10,071,863 | B2 | 9/2018 | Koenig |
| 10,072,223 | B2 | 9/2018 | Koenig |
| 10,081,148 | B2 | 9/2018 | Koenig et al. |
| 10,190,065 | B2 | 1/2019 | Koenig |
| 10,640,309 | B2 | 5/2020 | Koenig |
| 2001/0039887 | A1 | 11/2001 | Reddoch |
| 2001/0040230 | A1 | 11/2001 | Yoo et al. |
| 2002/0112403 | A1 | 8/2002 | Pope |
| 2003/0062389 | A1 | 4/2003 | Dopp |
| 2004/0035804 | A1 | 2/2004 | Bischof |
| 2004/0071618 | A1 | 4/2004 | Sprouse |
| 2004/0107638 | A1 | 6/2004 | Graham |
| 2004/0145074 | A1 | 7/2004 | Habibi-Naini |
| 2004/0184900 | A1 | 9/2004 | Christensen |
| 2004/0208732 | A1 | 10/2004 | Kulbeth |
| 2004/0222241 | A1 | 11/2004 | Link |
| 2005/0000581 | A1 | 1/2005 | Lane et al. |
| 2005/0054507 | A1 | 3/2005 | Cornay et al. |
| 2005/0069446 | A1 | 3/2005 | Kriehn |
| 2005/0189287 | A1 | 9/2005 | Lin et al. |
| 2006/0032957 | A1 | 2/2006 | Kolbet |
| 2006/0089516 | A1 | 4/2006 | Giercke |
| 2006/0219831 | A1 | 10/2006 | Yamamoto |
| 2007/0137537 | A1 | 6/2007 | Drisdelle |
| 2007/0214971 | A1 | 9/2007 | Williams et al. |
| 2008/0018065 | A1 | 1/2008 | Hirao et al. |
| 2008/0028952 | A1 | 2/2008 | Duperon |
| 2008/0121497 | A1 | 5/2008 | Esterson et al. |
| 2008/0134948 | A1 | 6/2008 | Vera |
| 2008/0209807 | A1 | 9/2008 | Tsangaris |
| 2008/0282944 | A1 | 11/2008 | Tuzson |
| 2008/0299021 | A1 | 12/2008 | Boykin et al. |
| 2009/0019771 | A1 | 1/2009 | Pearson |
| 2009/0022570 | A1 | 1/2009 | Craig |
| 2009/0126276 | A1 | 5/2009 | Johnson et al. |
| 2009/0130003 | A1 | 5/2009 | Koch |
| 2009/0173005 | A1 | 7/2009 | Neumann |
| 2009/0183971 | A1 | 7/2009 | Basagila et al. |
| 2009/0260823 | A1 | 10/2009 | Prince-Wright et al. |
| 2009/0285765 | A1 | 11/2009 | Ivanova |
| 2010/0040527 | A1 | 2/2010 | Randhava |
| 2010/0051875 | A1 | 3/2010 | Chornet et al. |
| 2010/0223839 | A1 | 9/2010 | Garcia-Perez |

(56) References Cited

U.S. PATENT DOCUMENTS

| | | | |
|---|---|---|---|
| 2010/0249991 | A1 | 9/2010 | Asano et al. |
| 2010/0251944 | A1 | 10/2010 | Stryzhak et al. |
| 2010/0266230 | A1 | 10/2010 | Hong |
| 2011/0011283 | A1 | 1/2011 | Burke |
| 2011/0033268 | A1 | 2/2011 | Craig et al. |
| 2011/0072723 | A1 | 3/2011 | Li et al. |
| 2011/0100388 | A1 | 5/2011 | Li et al. |
| 2011/0114144 | A1 | 5/2011 | Green et al. |
| 2011/0162275 | A1 | 7/2011 | Hladun et al. |
| 2011/0168823 | A1 | 7/2011 | Rosen |
| 2011/0173887 | A1 | 7/2011 | Tyler, Sr. |
| 2011/0212012 | A1 | 9/2011 | McAlister |
| 2011/0232191 | A1 | 9/2011 | Diebold et al. |
| 2011/0262985 | A1 | 10/2011 | Medoff |
| 2011/0271649 | A1 | 11/2011 | Tetzlaff |
| 2012/0063965 | A1 | 3/2012 | Coates et al. |
| 2012/0066974 | A1 | 3/2012 | Jorgenson et al. |
| 2012/0128560 | A1 | 5/2012 | Krishnamurthy et al. |
| 2012/0160417 | A1 | 6/2012 | Lee |
| 2012/0182827 | A1 | 7/2012 | Bairamijamal |
| 2012/0199795 | A1 | 8/2012 | Gordetsky et al. |
| 2012/0258021 | A1 | 10/2012 | Badger et al. |
| 2012/0267459 | A1 | 10/2012 | Beirakh et al. |
| 2012/0292127 | A1 | 11/2012 | Teshima |
| 2013/0089470 | A1 | 4/2013 | Takafuji |
| 2013/0149765 | A1 | 6/2013 | Austin |
| 2013/0192543 | A1 | 8/2013 | Tinterecker |
| 2013/0327258 | A1 | 12/2013 | Sato et al. |
| 2014/0339346 | A1 | 11/2014 | Koenig et al. |
| 2015/0202632 | A1 | 7/2015 | Koenig et al. |

FOREIGN PATENT DOCUMENTS

| | | | |
|---|---|---|---|
| CA | 2729040 | A1 | 6/2012 |
| CA | 2932605 | A1 | 6/2015 |
| CA | 2842973 | C | 5/2017 |
| CN | 202040828 | U | 11/2011 |
| CN | 202849347 | U | 4/2013 |
| CN | 109367834 | * | 11/2018 |
| DE | 19853717 | A1 | 5/2000 |
| DE | 202006016442 | U1 | 3/2008 |
| DE | 102006050603 | A1 | 4/2008 |
| DE | 102008012156 | A1 | 9/2009 |
| EP | 0256186 | A1 | 2/1988 |
| EP | 0294627 | A2 | 12/1999 |
| EP | 782604 | B1 | 12/1999 |
| EP | 1288278 | A1 | 3/2003 |
| EP | 1498678 | A1 | 1/2005 |
| EP | 3166715 | A1 | 6/2015 |
| GB | 1057977 | | 12/1964 |
| GB | 2029355 | A | 3/1980 |
| GB | 2516122 | A | 1/2015 |
| GB | 2526490 | A | 11/2015 |
| GB | 2511889 | B | 5/2016 |
| GB | 2511890 | B | 9/2016 |
| GB | 3166715 | | 5/2019 |
| HK | 1202306 | | 6/2017 |
| HK | 1202307 | | 8/2017 |
| HK | 1202304 | | 12/2017 |
| HK | 1202305 | | 12/2017 |
| JP | 7158767 | A | 6/1995 |
| JP | 200784758 | | 4/2017 |
| KR | 20110023251 | * | 3/2011 |
| WO | 90/06931 | | 6/1990 |
| WO | 9310893 | A1 | 6/1993 |
| WO | 94/25148 | A1 | 11/1994 |
| WO | 94/26506 | | 11/1994 |
| WO | 9513493 | A1 | 5/1995 |
| WO | 2004039923 | A1 | 5/2004 |
| WO | 2012034148 | A1 | 3/2012 |
| WO | 2014143167 | A1 | 9/2014 |
| WO | 2014143168 | A1 | 9/2014 |
| WO | 2014143169 | A1 | 9/2014 |
| WO | 2014143170 | A1 | 9/2014 |
| WO | 2014145648 | A1 | 9/2014 |
| WO | 2015084873 | A1 | 6/2015 |
| WO | 2017106348 | A1 | 6/2017 |
| WO | 2017106355 | A1 | 6/2017 |

OTHER PUBLICATIONS

Intcorecycling.com, GreenMax Recycling Machine, product information, 2 pages, found at www.intcorecycling.com, copyrighted 2009-2010.

RecycleTech Corp., RecycleTech—The Environment Savers, company information, 1 page, found at www.recycletechno.com, copyrighted 2009.

Foam Equipment + Consulting Co., Heger Recycling Equipment, sales literature, 3 pages, found at www.foamequipment.com/heger. com, copyrighted 2011.

Intcorecycling.com, GreenMax Recycling Machine, product information, 1 page, found at www.intcorecycling.com, copyrighted 2009-2010.

PolyMax, Polystyrene Foam Densifier, product information, 1 page, found at www.polyman5000.com, copyrighted 2006.

Runi Danish Engineering, Screw Compactor, product information, 2 pages, found at www.compactor-runi.com, Apr. 19, 2011.

Runi Danish Engineering, SK240, sales literature, 1 page, found at www.runi.dk, copyrighted 2009.

FKC Co., Ltd., Biosolids Dewatering, sales literature, 2 pages, found at www.fkcscrewpress.com, copyrighted 2009.

Exhibit B, Photo of known Dual Auger Shredder.

Exhibit C, Photo looking inside known Dual Auger Shredder.

Exhibit D, Photo of known Dual Auger Shredder inside warehouse.

Exhibit E, Photo of known Dual Auger Shredder outside warehouse.

Komar Industries, photos from a video of the Exemplary Embodiment compacting a crate, 2018, https://vimeo.com/288545615/5112c56c15, 4 pages.

Environmental Industry Associations, American National Standard for Equipment Technology and Operations for Wastes and Recyclable Materials, Jan. 15, 2008, 44 pages.

* cited by examiner

DETAIL C

SECTION A-A

DETAIL B

Control System

SYSTEM AND METHOD FOR SEPARATION OF ORGANICS AND LIQUIDS FROM WASTE MATERIAL

This application claims the benefit of U.S. Provisional Application No. 62/865,713, filed Jun. 24, 2019, which is incorporated by reference in its entirety.

BACKGROUND AND SUMMARY OF THE INVENTION

Exemplary embodiments of the present invention relate generally to a system and method for separating organics and liquids from waste material.

A wide variety of materials may end up in the waste stream. Some of the material may be recyclable and/or convertible to another useful purpose (e.g., fuel, etc.). Organics and other types of liquids are often put in the garbage as well. For example, food, beverages, plants, and many other types of organics and other liquids become waste. These organics and other types of liquids may also be convertible to another useful purpose (e.g., fuel, fertilizer, etc.).

However, in a waste stream, these potentially valuable materials are frequently intermixed. For example, municipal solid waste may originate from residential, commercial, institutional, and other locations. Each waste load may be comprised of many different types of waste. Some waste loads may have a relatively high organics or other liquid content (such as waste from a restaurant) in comparison to other loads. Moreover, after collection, a waste load may be further combined with even more variety of waste, such as upon delivery to a landfill or other deposit location, where waste streams may arrive from many different locations.

The mixing of various types of waste increases the difficulty or may even prevent the reuse of any particular type of waste. For example, waste saturated with organics and other types of liquids may not be suitable for recycling or conversion to another type of use. As another example, waste saturated with organics and other types of liquids may be difficult to process. For instance, it is often desirable to compact the material to be used for recycling or another purpose, or it may simply be necessary to compact the waste material to extract any organics and other liquid content. However, organics and other types of liquids may inhibit or effectively prevent compaction of the solid material, such as by rendering the compaction equipment ineffective for its intended purpose (e.g., the organics and other liquids may evade the compaction equipment and inhibit compaction). The ability of the compaction equipment to transmit force through the waste material is reduced, which leads to an increased buildup of waste material and may eventually require stoppage of the equipment to address the problem.

In addition, processing equipment may have difficulty transitioning between different types of waste loads. For example, processing equipment may be set to operate at a particular speed or other operational characteristic that is suitable for particular load conditions. When the content of the waste load changes, the processing equipment may be rendered inefficient or ineffective. For example, as noted above, a load that is high in organics or other liquid content may inhibit processing, and the processing equipment may not be able to adequately adjust to improve processing. As noted before, the waste stream will build up, and the processing equipment may have to be shut down to address the problem.

In view of the aforementioned difficulties of processing waste that includes organics and other liquids, there is increasing demand to recycle or otherwise reuse waste material. For example, state or local authorities may require commercial waste facilities to divert a certain amount waste away from the landfill such as for recycling or other conversion. Furthermore, such requirements are frequently progressive over a period of years. As a result, municipal solid waste facilities have a need to efficiently process the waste to facilitate diversion of applicable materials.

Organics and other liquids frustrate the effort to efficiently process and divert materials. A need therefore exists for an improved system and method for processing and/or compacting waste materials. A further need exists for a system and method that may efficiently adapt to changes in waste load conditions. A need also exists for an improved system and method for separating organics and other liquids from waste material.

Exemplary embodiments of the present invention may satisfy any or all of the aforementioned needs. One exemplary embodiment of a waste processing system and method may comprise an elongated extrusion screw and/or an adjustable compression gate to improve the compression of waste material. An improved extraction tube may also be provided to facilitate separation and removal of organics and other liquids from the compressed material. In an exemplary embodiment, at least one sensor may be provided for sensing an increasing accumulation of waste material awaiting to be processed. An exemplary embodiment may also be adapted to add dry fraction to a waste load that is wet with organics or other liquids to improve compressibility.

In an exemplary embodiment, a system and method may also be adapted to automatically adjust to improve compression of the material and facilitate more efficient production. For example, exemplary embodiments of a system and method may facilitate continuous production such as by eliminating the need to shut down the machine to clear an obstruction (e.g., remove excess organics or other liquids) and/or eliminating the need to manually change the settings of the machine to improve processing. In an exemplary embodiment, any or all of the aforementioned features may be adapted to facilitate more efficient, automatic, and/or continuous operation of a system and related method for processing waste.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figures 1, 2, 3, 4, 5:
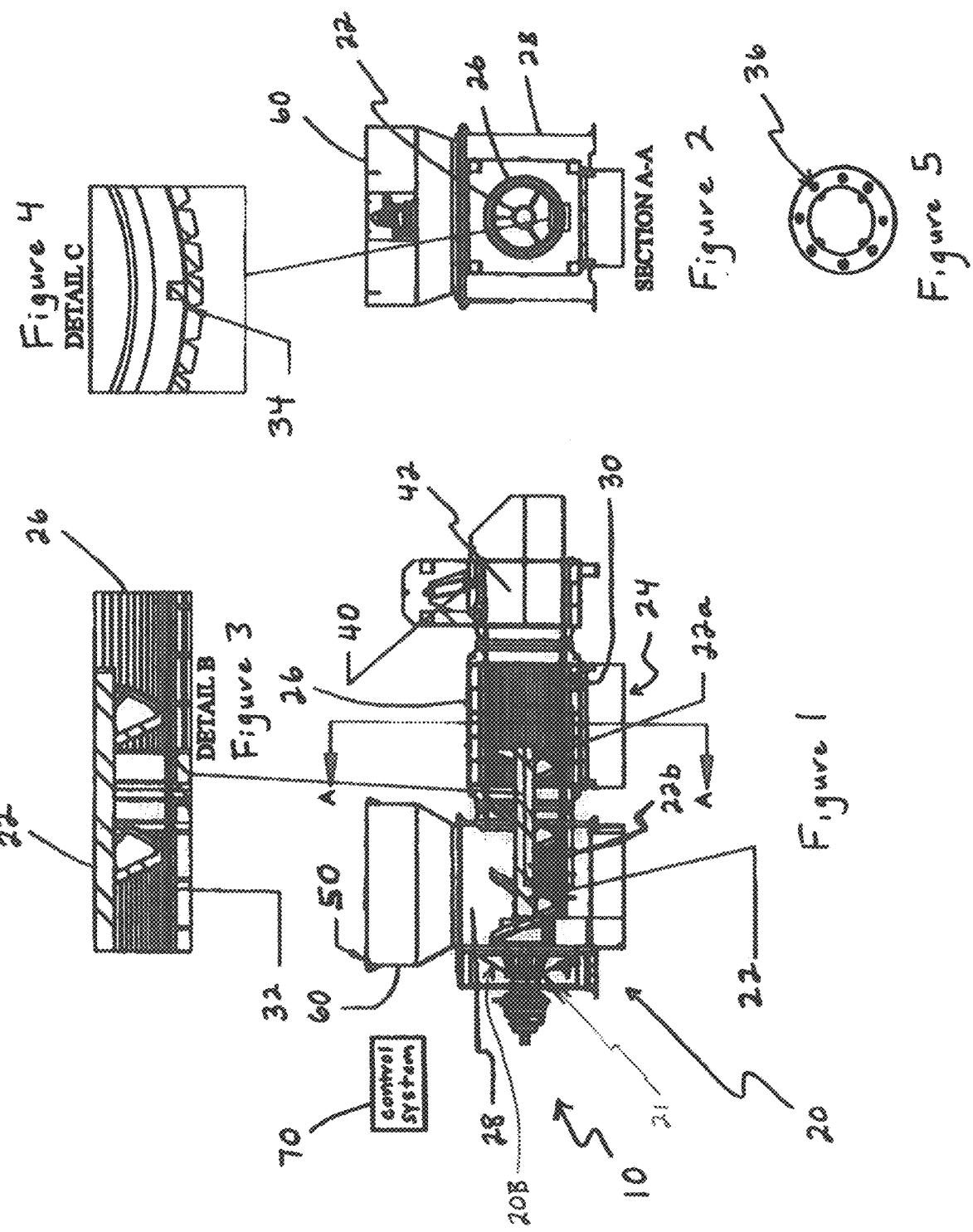
FIG. 1 is a cross-sectional view of an exemplary embodiment of a system for compressing waste material and extracting organics and other liquids.
FIG. 2 is a cross-sectional view of the system of FIG. 1 taken along line A-A.
FIG. 3 shows a detail B of FIG. 1.
FIG. 4 shows a detail C of FIG. 2.
FIG. 5 is an end elevation view of an exemplary embodiment of an extraction tube.

Exemplary embodiments of the present invention are directed to systems and methods for compressing waste material and/or separating organics and other liquids from a waste load. As a result, exemplary embodiments may facilitate effective diversion of waste materials.

FIGS. 1-5 show one exemplary embodiment of a system 10 that may comprise a cantilevered screw system 20. An exemplary embodiment of cantilevered screw system 20 may comprise a cantilevered screw assembly 20B. Cantilevered screw assembly 20B may comprise a drive assembly 21 that is associated with a cantilevered screw 22, wherein cantilevered screw 22 may be elongated to extend further into a compression section 24 of a cantilevered screw system 20 as compared to a conventional waste extrusion system. In one embodiment, a distal portion 22*a* of cantilevered screw 22 may extend into a compression section 24 for a distance that is at least 1 time (e.g., between 1 and 1.5 times) the inner diameter at the entry of the compression section 24 through which material is extruded. The elongated length of a cantilevered screw 22 may improve the compressive force on the material in a compression section 24.

In an exemplary embodiment, a compression section 24 comprises an extraction tube 26, wherein cantilevered screw 22 extends into extraction tube 26 for a distance that is at least 1 time (e.g., between 1 and 1.5 times) the inner diameter at the entry of the extraction tube 26. As a result, extraction tube 26 is connected to processing chamber 28 (which houses a proximal portion 22*b* of cantilevered screw 22, which is associated with drive assembly 21 that is situated outside of the processing chamber) such that it receives material processed (i.e., extruded) by cantilevered screw 22, and the elongated length of cantilevered screw 22 improves the compressive force on the material in extraction tube 26 as compared to a system having a shorter screw. In an exemplary embodiment, extraction tube 26 allows for organics and other liquids to be separated from waste material such that a dryer fraction results (which will be collectively referred to as a dry fraction herein). For example, waste material may be compressed in extraction tube 26, and organics and other liquids may be removed from extraction tube 26. In an exemplary embodiment, organics and other liquids may drain out of or be expelled from extraction tube 26. For instance, extraction tube 26 may be perforated with at least one hole (e.g., at bottom 30 and/or along any other portion of extraction tube 26) such that organics and other liquids may drain or be expelled from extraction tube 26 when material therein is compressed. In an exemplary embodiment, compression section 24 may be connected or otherwise associated with a collection tank that may collect the organics and other liquids that are removed from extraction tube 26. Such organics and other liquids may subsequently be diverted to another purpose.

An exemplary embodiment of an extraction tube 26 may include features to assist with processing of the waste material. For instance, such as shown in FIG. 3, an exemplary embodiment may include at least one material flow bar 32 to assist with transfer of the waste material. An exemplary embodiment may also include at least one self-cleaning wedge wire 34 such as shown in FIG. 4. Furthermore, in order to address wear, an exemplary embodiment of an extraction tube 26 may be indexable such that the extraction tube 26 may be rotated to reposition a worn area and extend the life of the extraction tube 26. For instance, FIG. 5 shows one exemplary embodiment of an extraction tube that may be indexable to eight different positions 36 for connection to a screw housing.

As shown in FIG. 1, an exemplary embodiment of a system 10 may further comprise a compression gate 40, which may also be referred to as a compression ram platen. A compression gate 40 may be positioned at a distal portion 42 of a compression section 24 (relative to the distal end 22*a* of the cantilevered screw 22) to influence a flow of material through the compression section 24. In this exemplary embodiment, a compression gate 40 may have a pivoted connection to or in a compression section 24 to enable compression gate 40 to transition between different positions to influence a flow of material to a desired degree. In the example of FIG. 1, compression gate 40 is shown in an open position, and it may pivot down (or otherwise move down) a desired degree to impede the flow and increase compaction of the material. However, in other exemplary embodiments, a compression gate 40 may have any suitable relationship to a compression section 24 such that it allows for performance of the desired function. In an exemplary embodiment, a compression gate 40 may be raised or lowered (or otherwise adjusted to change the size of the opening of a compression section 24) to make it easier or more difficult for material to flow through a compression section 24. In other words, a compression gate 40 may be adjusted to influence (e.g., increase or reduce) the compression of waste material in an extraction tube 26. Furthermore, in an exemplary embodiment, a compression gate 40 may be automatically adjusted in response to load conditions (e.g., the amount of organics and/or liquids in the waste material and/or associated process conditions) to facilitate more efficient or continuous operation.

For instance, an exemplary embodiment of a system 10 may also include a level sensor 50 that is adapted to detect a level of material that is awaiting to be processed by a cantilevered screw system 20. By detecting an abnormally high level of material awaiting to be processed, an exemplary embodiment of a level sensor 50 may help determine that processing of the material may be inhibited, such as may occur when there is an excessive amount of organics or other liquids in the waste that is inhibiting compaction. For example, such as shown in FIG. 1, a level sensor 50 may be positioned in a hopper 60 of a cantilevered screw system 20 or may otherwise be positioned in order to determine a level of material in hopper 60. In particular, hopper 60 is configured to direct material into processing chamber 28, and level sensor 50 is adapted to sense a level of material that may accumulate in hopper 60 during processing of the material. In an exemplary embodiment, a level sensor 50 may be in communication with a control system 70 associated with a compression gate 40. In this manner, when a level sensor 50 detects a backup of material, a control system 70 may raise or otherwise adjust a compression gate 40 to make it easier for the waste material to flow through the compression section 24. When the backup of material is reduced, the control system 70 may lower or otherwise adjust the compression gate 40 to facilitate improved extraction of organics and other liquids from the waste material. In an exemplary embodiment, a compression gate 40 may be automatically raised or lowered (or otherwise adjusted) proportionally to the level of material awaiting to be processed to achieve the most efficient operation.

Figure 6:
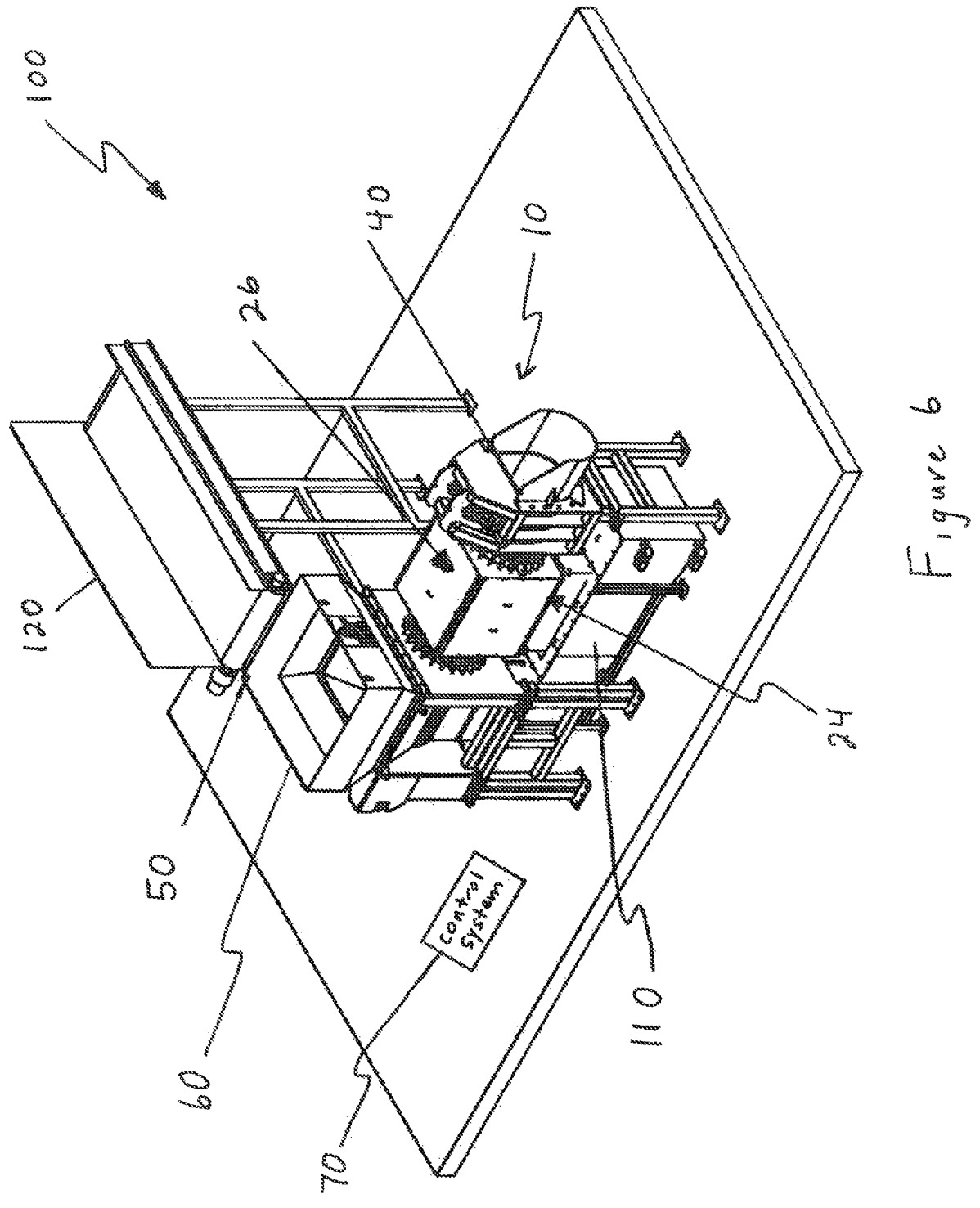
FIG. 6 is a perspective view of an exemplary embodiment of a system that comprises a level sensor that is adapted to facilitate proportional control of a compression ram platen relative to a level of material in a feed hopper.

FIG. 6 shows an example of a system 100 that may be adapted to automatically adjust a compression gate 40 proportionally to a level of material that may accumulate in a hopper 60. System 100 may comprise a system 10 or a similar extraction system. In an exemplary embodiment, system 100 may further comprise a collection tank 110. Collection tank 110 may be connected or otherwise associated with a compression section 24 in order to collect the organics and other liquids that are released from extraction tube 26. Such organics and other liquids may subsequently be diverted from collection tank 110 to another purpose. System 100 may further comprise a material delivery system 120 that is adapted to deliver material to hopper 60. Examples of a material delivery system 120 may include a conveyor, lift, or any other suitable means for delivering material to the hopper 60.

Figures 7, 8:
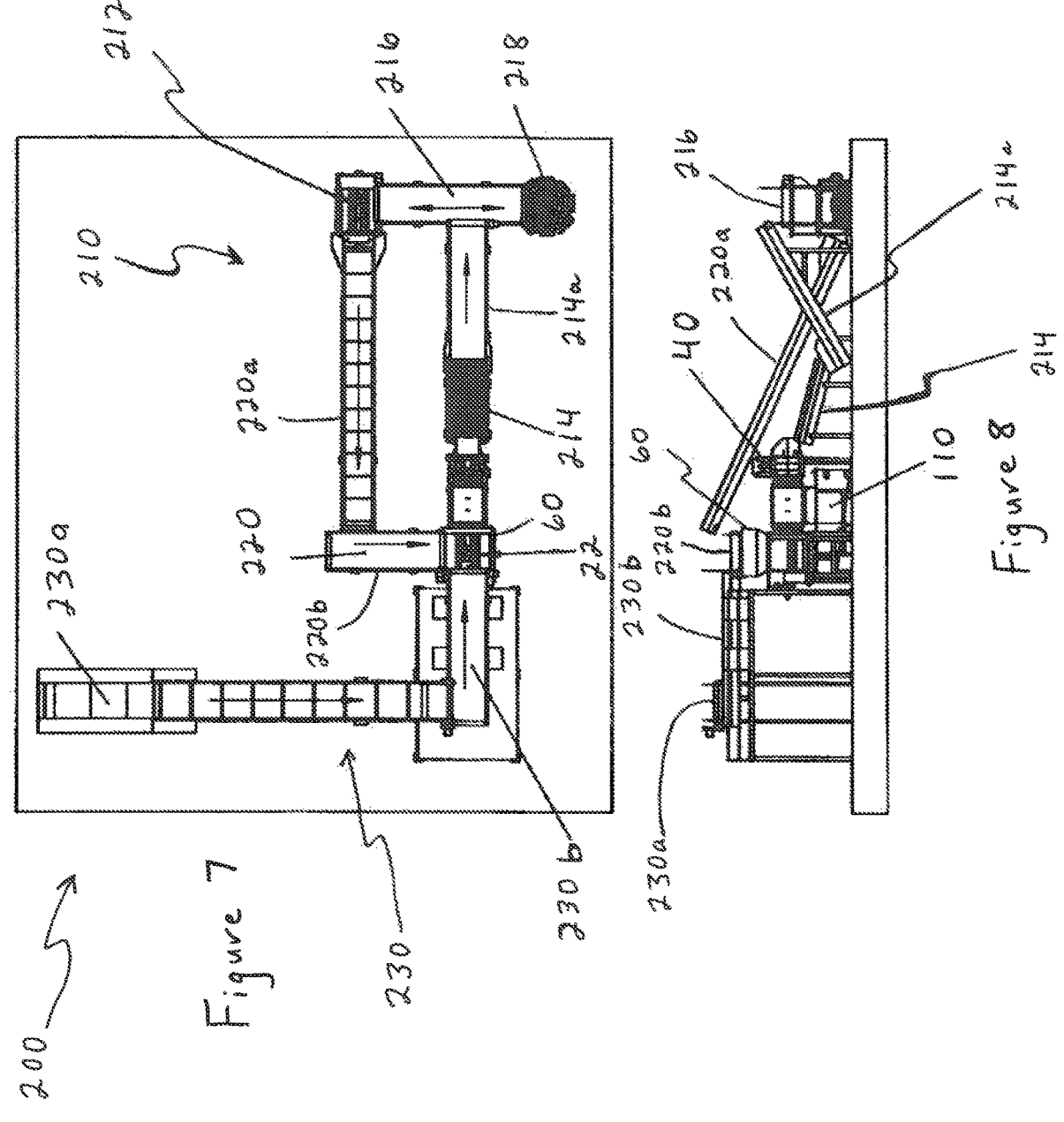
FIG. 7 is a top plan view of an exemplary embodiment of a system that comprises a recirculating loop that is adapted to facilitate the introduction of dry fraction into a wet waste infeed.
FIG. 8 is a side elevation view of the system of FIG. 7.

FIGS. 7 and 8 show another exemplary embodiment of a system 200 in which dry fraction may be added to waste infeed that is saturated with organics and other liquids to improve compressibility. System 200 may comprise a system 10, system 100, or a similar extraction system. In an exemplary embodiment, a recirculating loop 210 may be provided such that dry fraction may be added to wet loads. Recirculating loop 210 may be in communication with control system 70 in order to control the introduction of dry fraction. An exemplary embodiment of a recirculating loop 210 may include a storage bunker 212 that is adapted to collect dry fraction that may be used for this purpose. An exemplary embodiment may also include a screening section 214 for screening off fines (i.e., fine particles), which may be diverted to an alternative purpose (e.g., use as a ground cover). An example of screening section 214 may comprise a conveyor 214a for further transferring the remainder of the dry fraction. A bi-directional transfer mechanism 216 (e.g., a conveyor) may then receive the dry fraction from screening section 214. In an exemplary embodiment, a bi-directional transfer mechanism 216 may be adapted to deliver dry fraction to storage bunker 212. For example, a bi-directional transfer mechanism 216 may deliver dry fraction to storage bunker 212 as needed or until the storage bunker 212 is full. When dry fraction is not needed or the storage bunker 212 is full, an exemplary embodiment of a bi-directional transfer mechanism 216 may transport dry fraction in the opposite direction. For example, such dry fraction may be collected (e.g., deposited in a pile 218) and subsequently diverted for another purpose. In an exemplary embodiment, a recirculating loop 210 may also be automated such that a wet load may be sensed (e.g., as described above regarding level sensor 50, wherein control system 70 may automatically cause dry fraction to be added to the wet load to improve compressibility). For example, a dry fraction return system 220 may automatically transfer dry fraction from storage bunker 212 to hopper 60 to address a wet load. In this example, dry fraction return system 220 comprises a conveyor 220a that transfers dry fraction from storage bunker 212, and a conveyor 220b that receives dry fraction from conveyor 220a and delivers the dry fraction to hopper 60. While this embodiment of dry fraction return system 220 comprises two conveyors, other exemplary embodiments of a dry fraction return system may comprise any suitable number of any suitable type of transfer device to transfer dry fraction from a storage bunker to an input hopper.

For instance, a dry fraction recirculating loop 210 of system 200 may be useful for wet loads such as those from a restaurant to improve compressibility. In an exemplary operation, system 200 may comprise an input delivery system 230 to deliver a waste load to hopper 60. In this example, input delivery system 230 comprises a conveyor 230a for receiving a waste load such as from a garbage truck, and a conveyor 230b that receives the waste load from conveyor 230a and transfers the waste load to hopper 60. In an exemplary embodiment, trash may also be sorted/picked from conveyor 230b prior to being deposited in hopper 60. While this example of input delivery system 230 comprises two conveyors, other exemplary embodiments of an input delivery system may comprise any suitable number of any suitable type of transfer device to transfer a waste load to an input hopper. The material is then compressed (e.g., such as by system 10, system 100, or the like), and organics and liquids are collected in collection tank 110. The remaining dry fraction proceeds into recirculating loop 210. Fine particles may be separated from the dry fraction in screening section 214. In this exemplary embodiment, the dry fraction is transferred by conveyor 214a to bi-directional transfer mechanism 216. Bi-directional transfer mechanism 216 may deposit dry fraction in storage bunker 212 (e.g., as needed or until full). If there is not a demand for dry fraction, bi-directional transfer mechanism 216 may transfer the dry fraction in another direction for another purpose (e.g., pile 218). In the event of a wet input load to hopper 60, dry fraction return system 220 may transfer dry fraction from storage bunker 212 to hopper 60. In an exemplary embodiment, the process of recirculating loop 210 may be repeated indefinitely and/or automatically in order to improve the processing of wet loads.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for separation of organics and liquids from waste material, said system comprising:

a processing chamber adapted to receive material to be processed;

a cantilevered screw assembly comprising a cantilevered screw and a drive assembly, said cantilevered screw comprising a proximal portion and a distal portion, and said drive assembly associated with said proximal portion, such that said proximal portion is cantilevered to a wall of said processing chamber such that said proximal portion is not otherwise supported except where cantilevered to said wall of said processing chamber, and such that said drive assembly is adjacent to said wall and outside of said processing chamber, said cantilevered screw assembly adapted to process the material; and an extraction tube adapted to receive the material processed by said cantilevered screw assembly, said extraction tube connected to said processing chamber such that said distal portion of said cantilevered screw extends into said extraction tube for a distance that is at least 1 time an inner diameter at an entry of said extraction tube; wherein said extraction tube is adapted to facilitate compression of the material such that organics and liquids are separated from the material;

wherein said extraction tube is perforated with at least one hole such that organics and other liquids are adapted to drain or be expelled from said extraction tube when the material therein is compressed;

the system further comprising a compression gate adapted to influence a flow of the material through said extraction tube such that said compression gate is adapted to increase or decrease compression of the material in said extraction tube to a desired degree;

wherein said compression gate is adapted to be automatically adjusted to influence the flow of the material through said extraction tube in response to a level of material awaiting to be processed by said cantilevered screw assembly.

2. The system of claim 1 wherein said distal portion of said cantilevered screw extends into said extraction tube for a distance that is between 1 and 1.5 times said inner diameter at said entry of said extraction tube.

3. The system of claim 1 further comprising:

a hopper adapted to direct material into said processing chamber to be processed; and a level sensor positioned to determine a level of the material in said hopper;

wherein said system is adapted to automatically adjust said compression gate in response to the level of the material in said hopper.

4. The system of claim 1 wherein said system is adapted to automatically adjust said compression gate in response to an amount of organics and liquid in the material.

5. The system of claim 1 wherein:

said system is adapted to automatically adjust said compression gate to increase compression of the material; and said system is adapted to automatically adjust said compression gate to decrease compression of the material.

6. The system of claim 1 further comprising a collection tank associated with said extraction tube such that said collection tank is adapted to collect organics and liquids that drain or are expelled from said extraction tube when the material therein is compressed.

* * * * *